(12) United States Patent
Daukant

(10) Patent No.: US 7,581,377 B2
(45) Date of Patent: Sep. 1, 2009

(54) LOW-COST FRANGIBLE CABLE FOR GAS TURBINE ENGINE

(75) Inventor: Robert A. Daukant, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 499 days.

(21) Appl. No.: 11/452,297

(22) Filed: Jun. 14, 2006

(65) Prior Publication Data

US 2007/0289312 A1    Dec. 20, 2007

(51) Int. Cl.
*F02G 3/00*    (2006.01)
(52) U.S. Cl. ................................ 60/39.091; 60/223
(58) Field of Classification Search ............... 60/779, 60/39.091, 39.281, 223; 415/9, 14
See application file for complete search history.

(56) References Cited

U.S. PATENT DOCUMENTS

| | | | | | |
|---|---|---|---|---|---|
| 2,930,189 | A | * | 3/1960 | Petrie | 60/39.091 |
| 3,050,939 | A | * | 8/1962 | Morley | 60/39.091 |
| 3,141,297 | A | * | 7/1964 | Shields | 60/771 |
| 7,002,172 | B2 | | 2/2006 | Rensch | |

* cited by examiner

*Primary Examiner*—Michael Cuff
*Assistant Examiner*—Andrew Nguyen
(74) *Attorney, Agent, or Firm*—Ogilvy Renault LLP

(57) ABSTRACT

An emergency fuel shut-off system for a gas turbine engine comprises a fuel shut-off device to be actuated for terminating a fuel supply to the engine in response to a mechanical actuation force and an actuator adapted for creating the mechanical actuation force when a rotor shaft of the engine fails. A fuse apparatus is provided to link the actuator with the shut-off device in order to transmit the mechanical actuation force. The fuse apparatus disables transmission of the mechanical actuation force when the transmitted mechanical actuation force exceeds a pre-selected level.

10 Claims, 3 Drawing Sheets

LOW-COST FRANGIBLE CABLE FOR GAS TURBINE ENGINE

TECHNICAL FIELD

The present invention relates generally to an automatic safety system for avoidance of an over-speed condition in the event of a rotor shaft failure of a gas turbine engine, and more particularly, to an improved emergency fuel shut-off system for a gas turbine engine.

BACKGROUND OF THE ART

An aircraft gas turbine engine requires an automatic mechanism to shut it down should any of the rotor shafts break, which can result in a turbine over-speed condition and possible disc burst. In an aircraft engine, failure of the low-pressure turbine shaft (which is relatively less stiff and strong than the high-speed rotor shaft) for example, and the resultant uncontrolled speed increase of the driving side (the low pressure turbine) of the low-pressure turbine shaft, can lead to destruction of the engine and damage to the aircraft, thereby resulting a considerable danger to persons and property. Emergency engine shutdown is required and is typically accomplished by shutting down the fuel supply to the fuel nozzles of the engine. In gas turbine engines various devices for the mechanical or electronic detection of shaft failure and for the subsequent interruption of the fuel supply to avoid or control a dangerous over-speed condition, are well known. Generally, the known electronic safety systems of gas turbine engines are disadvantageous in that the time delay until shut off of the fuel supply is relatively long. High costs are also incurred by the required cooling or heat shielding of the sensors and electrical connections situated in the hot zone of the rotor shafts. The known mechanical shut-off systems conventionally employ, for example, a reference shaft co-axially associated with a turbine shaft, and connected to the driven end thereof. In the event of shaft failure the resultant rotation of the turbine shaft relative to the reference shaft, is used to mechanically actuate the fuel valve. This type of mechanical system also requires a relatively long corresponding time delay and results in more difficulties in the design and assembly of the engine.

Accordingly, there is a need to provide an improved emergency fuel shut-off system for gas turbine engines in the event of a shaft failure.

SUMMARY OF THE INVENTION

It is therefore an object of this invention to provide an emergency fuel shut-off system for terminating a fuel supply to a gas turbine engine when failure of a rotor shaft of the engine is detected.

In one aspect, the present invention provides an emergency fuel shut-off system for a gas turbine engine which comprises a fuel shut-off device to be actuated for terminating a fuel supply to the engine in response to a mechanical actuation force; an actuator adapted for creating the mechanical actuation force to actuate the fuel shut-off device when a rotor shaft of the engine fails; and a fuse apparatus linking the actuator with the fuel shut-off device to transmit the mechanical actuation force from the actuator to the fuel shut-off device, the fuse apparatus being adapted to disable transmission of the mechanical actuation force in order to prevent damage to the fuel shut-off device when the transmitted mechanical actuation force exceeds a pre-selected level.

In another aspect, the present invention provides an emergency fuel shut-off system for a gas turbine engine which comprises a fuel shut-off valve to be actuated for terminating a fuel supply to the engine in response to a mechanical actuation force; an actuator adapted for creating the mechanical actuation force to actuate the fuel shut-off valve in response to an axial and rearward motion of a rotor shaft of the engine caused by failure of the rotor shaft; a cable linking the actuator with the fuel shut-off valve to transmit the mechanical actuation force from the actuator to the fuel shut-off valve; and means for disabling transmission of the mechanical actuation force through the cable in order to prevent damage to the fuel shut-off valve when the transmitted mechanical actuation force exceeds a pre-selected level.

In a further aspect, the present invention provides a method of emergency shut off of a gas turbine engine which comprises detecting a failure of a rotor shaft of the engine by sensing an axial and rearward motion of the rotor shaft; and creating a mechanical actuation force for actuating a fuel shut-off device to terminate a fuel supply to the engine in response to the sensed axial and rearward motion of the failed rotor shaft.

Further details of these and other aspects of the present invention will be apparent from the detailed description and figures included below.

DESCRIPTION OF THE DRAWINGS

Reference is now made to the accompanying drawings depicting aspects of the present invention, in which.

DETAILED DESCRIPTION OF THE PREFERRED EMBODIMENTS

Figure 1:
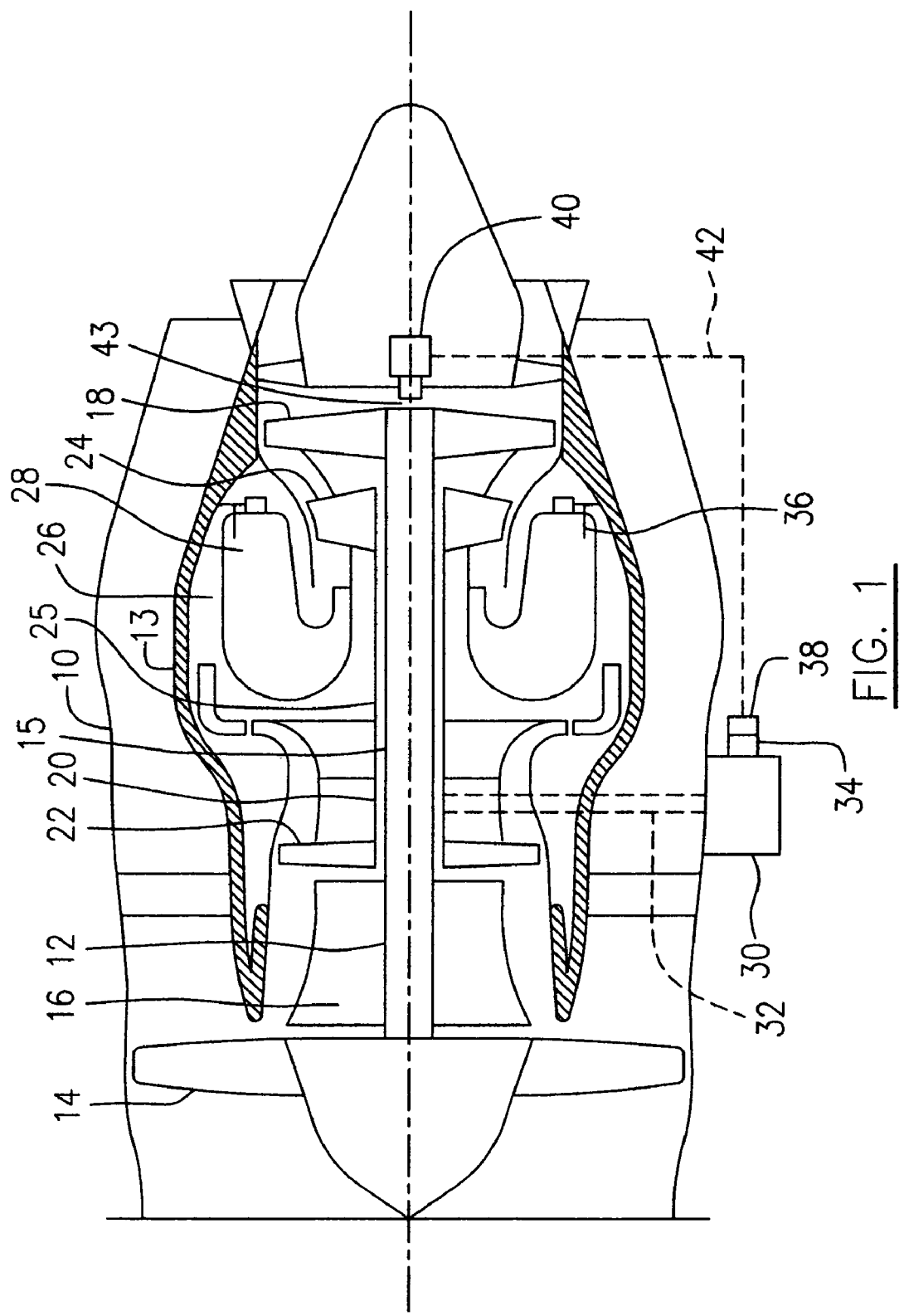
FIG. 1 is a schematic cross-sectional view of a turbofan gas turbine engine as an example illustrating an application of the present invention.

Referring to FIG. 1, a gas turbine engine incorporating an embodiment of the present invention is presented as an example of the application of the present invention and includes a housing 10, a core casing 13, a low pressure rotor assembly seen generally at 12 which includes a rotor shaft (referred to as N1 shaft 15 hereinafter) interconnecting a fan assembly 14, a low pressure compressor assembly 16 and a low pressure turbine assembly 18, and a high pressure rotor assembly seen generally at 20 which includes a rotor shaft (referred to as N2 shaft 25 hereinafter) interconnecting a high pressure compressor assembly 22 and a high pressure turbine assembly 24. The core casing 13 surrounds the low and high pressure rotor assemblies 12 and 20 in order to define a main fluid path (not indicated) therethrough, including a chamber 26 containing and surrounding a combustor 28. An auxiliary gear box (referred to as an AGB 30 hereinafter) is attached to the housing 10 and is drivingly connected to the N2 shaft 25 through a tower shaft 32. A fuel control unit (referred to as an FCU 34 hereinafter), for example, is connected to and driven by the AGB 30 to provide a fuel supply through a fuel passage (not shown) and a plurality of fuel nozzles 36, into the combustor 28 for combustion during engine operation.

Each of the N1 and N2 shafts 15, 25 has a driving side which is the rear end thereof including the respective low and high turbine assemblies 18, 24, and a driven side which is the front end thereof including the respective fan assemblies 14 with low pressure compressor assembly 16 and high pressure compressor assembly 22. If one of the N1 and N2 shafts 15, 25 fails between the driving and driven sides thereof, the rotational speed of the corresponding one of the turbine assemblies 18, 24 will rapidly increase beyond control because of the sudden loss of torque load. In order to prevent the over-speed of the turbine assemblies in the event of a rotor shaft failure, an emergency fuel shut-off system of the present invention is provided.

As an embodiment of the present invention the emergency fuel shut-off system in FIG. 1 is only related to the N1 shaft 15 because the N2 shaft 25 is relatively stiffer and stronger than the N1 shaft 15 and is less likely to break. Nevertherless, it should be understood that the emergency fuel shut-off of the present invention is equally applicable to the N2 shaft 25.

The emergency fuel shut-off system of the present invention generally includes a fuel shut-off device 38 preferably connected to the FCU 34. The fuel shut-off device 38 is adapted to be actuated for terminating the fuel supply from the FCU 34 to the fuel nozzles 36 in response to a mechanical actuation force. An actuator 40 adapted for creating the mechanical actuation force to actuate the fuel shut-off device 38 is provided, for example at the rear end of the N1 shaft 15. A fuse apparatus indicated by the broken line 42 is provided to link the actuator 40 with the fuel shut-off device 38 in order to transmit the mechanical actuation force up to a pre-selected level of force. The fuse apparatus 42 is enabled to disable the transmission of the mechanical actuation force in order to prevent damage to the fuel shut-off device 38 or the FCU 34 when the transmitted mechanical actuation force exceeds the pre-selected level.

The N1 and N2 shafts 15, 25 are both rotatably supported within the core casing 13 and axial clearances such as indicated by numeral 43, are maintained to allow for axial thermal expansion of the respective N1 and N2 shafts 15, 25 due to significant temperature variations during different operative conditions of the engine. During engine operation which provides a thrust force in a forward direction through the engine to an aircraft (not shown) carrying the engine, the N1 and N2 shafts 15, 25 are both pushed in a forward direction and are axially stopped by, for example, thrust bearings (not shown). In the event of a rotor shaft failure, for example when the N1 shaft 15 breaks, the fan assembly 14 and the low pressure assembly 16 no longer have loads acting thereon. Therefore, the combustion gas powering on the low pressure turbine assembly 18 and the incoming airflow acting on the fan assembly 14 and the low pressure compressor assembly 16, force the failed N1 shaft 15 to move rearwardly over the maintained axial clearance for the N1 shaft 15.

Such an axial and rearward motion of the rotor shaft always occurs when the rotor shaft fails. Therefore, in accordance with the present invention, the failure of a rotor shaft of the engine can be detected by sensing the axial and rearward motion of the rotor shaft. A mechanical actuation force for actuating the fuel shut-off device 38 to terminate the fuel supply to the engine can be created in response to the sensed axial and rearward motion of the rotor shaft. This can be done, for example by the actuator 40. However, the axial and rearward motion can cause a significant mechanical force which is difficult to predict. Since all parts of an aircraft engine are designed for minimum weight, a mechanism such as the emergency fuel shut-off device 38 and the FCU 34 on which the emergency fuel shut-off device 38 is attached, would be unacceptably heavy if designed to react to a potentially large mechanical force caused by the axial and rearward motion of the failed rotor shaft. Therefore, the fuse apparatus 42 which transmits the mechanical actuation force created by the actuator 40 to the emergency fuel shut-off device 38 on the FCU 34, has been designed to have adequate strength to ensure a positive fuel shut-off action of the emergency fuel shut-off device 38, but to sacrifice itself by breaking without overstressing the expensive FCU 34 and emergency shut-off device 38.

Figure 2:
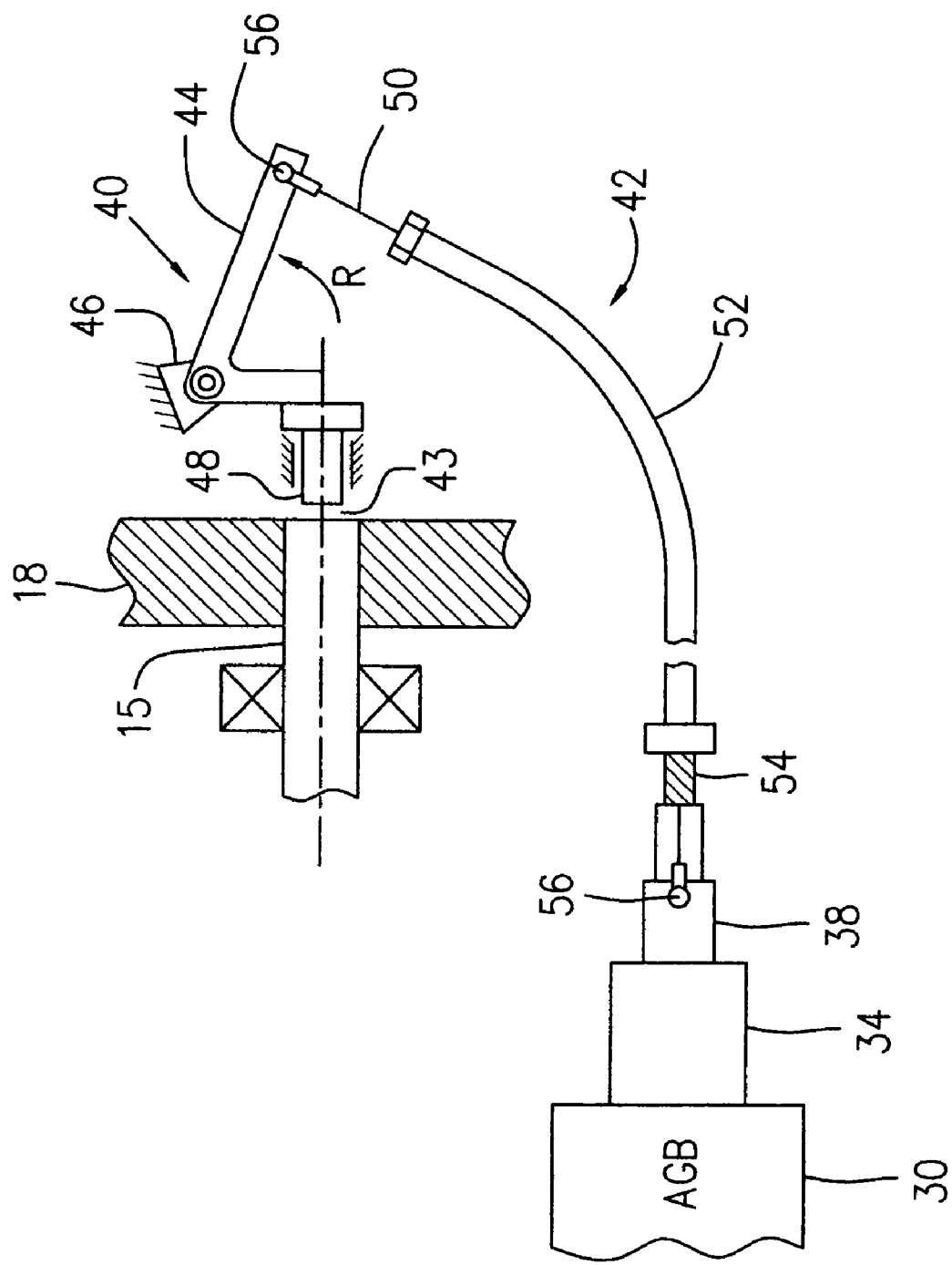
FIG. 2 is a schematic illustration showing an emergency fuel shut-off system for a gas turbine engine, incorporating one embodiment of the present invention illustrated in the engine of FIG. 1.
Figure 3:
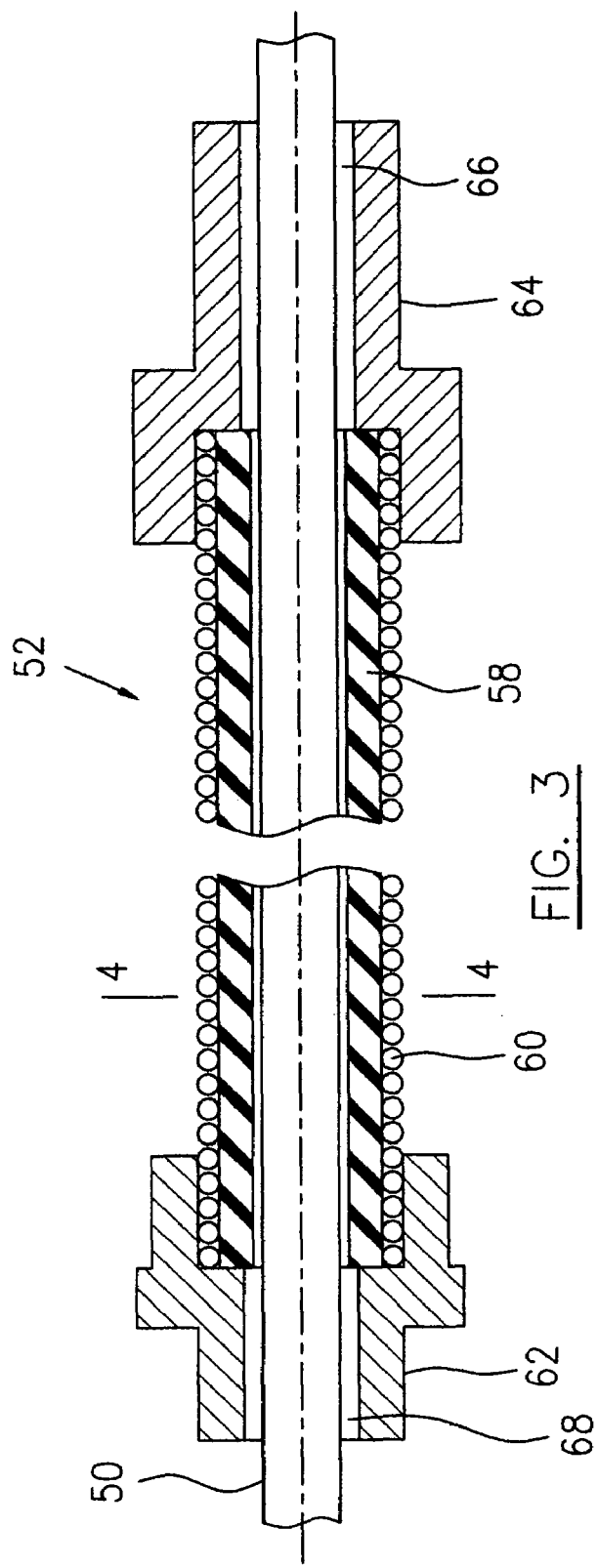
FIG. 3 is a partial cross-sectional view of a cable assembly used in the emergency fuel shut-off system of FIG. 2, showing a configuration of the cable casing thereof.
Figure 4:
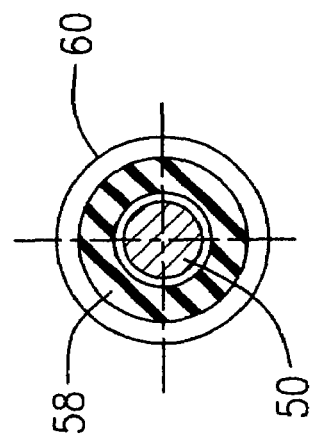
FIG. 4 is a cross-sectional view of the cable assembly, taken along line 4-4 of FIG. 3, showing the cross-section of the cable especially designed for permitting transmission of a force smaller than a pre-selected level of a mechanical actuation force transmitted therethrough.

Referring to FIGS. 2-4 which illustrate one embodiment of the present invention, the actuator 40 of the emergency fuel shut-off system preferably includes a lever member 44 preferably in a L-shape, pivotally attached to a stationary configuration 46 which is supported within the core casing 13 of the engine shown in FIG. 1. The lever member 44 has a short arm (not indicated) in contact, for example, with a plunger 48 which is slidably supported in a position rearward of the low pressure turbine assembly 18, separated from the N1 shaft 15 by the axial clearance 43. The lever member 44 also includes a long arm (not indicated) such that an axial end rearward motion of the N1 shaft 15 in a rotor shaft failure condition, brings the N1 shaft 15 into contact with the plunger 48 and further moves the plunger 48 rearwardly, thereby forcing the lever member 44 to rotate counter-clockwise around the pivot, as shown by the arrow R.

The fuse apparatus 42 of the emergency fuel shut-off system in this embodiment, preferably includes a cable assembly (not indicated) having a cable 50 slidably extending through a casing 52, for example. The cable 50 has one end thereof connected to a distal end of the long arm of the lever member 44 and the other end thereof is connected to the fuel shut-off device 38, preferably to a fuel shut-off valve (not indicated) included in that fuel shut-off device 38. Therefore, the counter-clockwise rotation of the lever member 44 caused by the rearward motion of the plunger 48 pulls the cable 50 at the end thereof connected to the lever member 44 and thus creates a mechanical actuation force. This mechanical actuation force is transmitted through the cable 50 to pull the fuel shut-off valve in the fuel shut-off device 38 which terminates the fuel supply from the FCU 34 to the engine. The casing 52 is flexible in order to be bent but is barely deformable along the length thereof in order to maintain the cable 50 extending therethrough in a tensioned condition when the end of the cable 50 connected to the lever member 44 is pulled. The casing 52 at one end thereof is preferably connected to a stationary part of the fuel shut-of device 38 through an adjustable support device 54 such that the distance between the fuel shut-off device 38 and that end of the cable casing 52 is adjustable. The other end of the cable casing 52 is preferably supported by a stationary configuration (not shown) of the core casing 13 of the engine shown in FIG. 1.

The cable 50 is preferably a stranded wire rope made of, for example $\frac{1}{16}$ inch corrosion resistant steel (CRES) cable the cross-section of which is sized such that the cable 50 has a strength having predetermined margins, to transfer a mechanical actuation force to actuate the fuel shut-off valve of the fuel shut-off device 38, but will stretch or break when the transmitted mechanical actuation force reaches a preselected level. In particular, the pre-selected level of the force is determined to be within a range between a minimum force required to effectively actuate the fuel shut-off valve and a maximum force which does not exceed the fuel shut-off valve's rated strength. Therefore, the cable 50 ensures the actuation action to close the fuel shut-off valve before it fails under a condition of the mechanical actuation force exceeding the pre-selected level. The cable 50 preferably has swaged ball ends 56. The ball ends 56 are integrally swaged to the cable 50 and thus welding is eliminated which speeds assembly and reduces costs. Ball ends result in a small, light cable and very fast installation of the cable 50 in the system.

The casing 52 is preferably manufactured from a Teflon™ (PTFE) tube 58 and an CRES spring wire 60 wound to fit over the Teflon™ tube 58. The CRES spring wire 60 is shown having a round cross-section but can have, for example, a rectangular cross-section. The Teflon™ is positioned immediately around the cable 50 and thus allows the cable 50 to slide therein and transmit the mechanical actuation force without seizing therein, which can otherwise occur over a period of time under the conditions of heat accompanying the frictional movement between the casing 52 and the cable 50. The casing 52 includes a first casing end 62 and a second casing end 64 affixed to the opposite ends of the casing 52 in order to secure the Teflon™ tube 58 together with the surrounding spring wire 60. The first casing end 62 is to be mechanically connected, for example, to a stationary configuration (not shown) which can be part of the core casing 13 of the engine of FIG. 1. The second casing end 64 is mechanically connected, for example, to the adjustable support device 54 to be attached to the stationary part of the fuel shut-off device 38. The respective casing ends 62, 64 comprise central bores 68, 66 which allow the cable 50 to extend therethrough. The diameter of the central bores 68, 66 is preferably greater than the inner diameter of the Teflon™ tube 58 in order to prevent possible jamming of the cable 50 therein. The central bores 68, 66 of the respective casing ends 62, 64 each define an enlarged recess (not indicated) at an inner end of the respective casing ends 62, 64 for accommodating the respective ends of the Teflon™ tube 58 and CRES spring wire 60. The casing ends 62, 64 are machined and fitted over the assembly of the Teflon™ tube 58 and the spring wire 60. No welding is required, which speeds assembly and minimizes costs. After the cable assembly is installed and rigged, the cable tension maintains the integrity of the assembly.

The emergency fuel shut-off system of the present invention is advantageously inexpensive in terms of manufacturing costs, particularly due to the low manufacturing cost of the cable assembly. After an event during which the emergency shut-off device 38 is actuated and the cable 50 fails (breaks or stretches), further savings in time and costs are realized because only the cable 50 in the system must be replaced and the remaining parts can be safely reused.

The above description is meant to be exemplary only, and one skilled in the art will recognize that changes may be made to the embodiments described without departure from the scope of the invention disclosed. For example, the emergency fuel shut-off system of the present invention can be applied in any type of engine, not only the turbo-fan engine exemplarily illustrated above, and is applicable to both low pressure and high pressure rotor shafts of gas turbine engines. Modifications to the particular configurations of the cable and cable casing other than those described in the embodiment of the present invention may be apparent to those skilled in the art and are intended to fall within the scope of the appended claims. Still other modifications which fall within the scope of the present invention will be apparent to those skilled in the art in light of a review of this disclosure, and such modifications are intended to fall within the appended claims.

The invention claimed is:

1. An emergency fuel shut-off system for a gas turbine engine, comprising:
   a fuel shut-off device to be actuated for terminating a fuel supply to the engine in response to a mechanical actuation force;
   an actuator adapted for creating the mechanical actuation force to actuate the fuel shut-off device when a rotor shaft of the engine fails;
   a fuse apparatus linking the actuator with the fuel shut-off device to transmit the mechanical actuation force from the actuator to the fuel shut-off device, the fuse apparatus being adapted to disable transmission of the mechanical actuation force in order to prevent damage to the fuel shut-off device when the transmitted mechanical actuation force exceeds a pre-selected level; and
   wherein the fuse apparatus comprises a cable having at least one cross-section thereof sized such that the cable fails when the mechanical actuation force transmitted through the cable exceeds the pre-selected level.

2. The system as defined in claim 1 wherein the pre-selected level of the mechanical actuation force is determined to be in a range between a minimum force required to effectively actuate the fuel shut-off device and a maximum force which will not damage the fuel shut-off device.

3. The system as defined in claim 1 wherein the fuel shut-off device comprises a fuel shut-off valve.

4. The system as defined in claim 1 wherein the fuse apparatus further comprises a casing for receiving the cable slidably extending therethrough.

5. The system as defined in claim 4 wherein the casing comprises a Teflon™ tube immediately around the cable.

6. The system as defined in claim 5 wherein the casing comprises a spring wire wound to fit over the Teflon™ tube along a substantial length thereof.

7. The system as defined in claim 1 wherein the cable comprises swaged ball ends thereof.

8. The system as defined in claim 1 wherein the actuator comprises a lever device associated with the rotor shaft of the engine, adapted to create the mechanical actuation force in response an axial and rearward motion of the rotor shaft caused by the failure of the rotor shaft.

9. An emergency fuel shut-off system for a as turbine engine, comprising:
   a fuel shut-off valve to be actuated for terminating a fuel supply to the engine in response to a mechanical actuation force;
   an actuator adapted for creating the mechanical actuation force to actuate the fuel shut-off valve in response to an axial and rearward motion of a rotor shaft of the engine caused by failure of the rotor shaft;
   a cable linking the actuator with the fuel shut-off valve to transmit the mechanical actuation force from the actuator to the fuel shut-off valve; and
   means for disabling transmission of the mechanical actuation force through the cable in order to prevent damage to the fuel shut-off valve when the transmitted mechanical actuation force exceeds a pre-selected level, the means being integrally incorporated with the cable.

10. The system as defined in claim 9 wherein the cable comprises at least one cross section thereof sized such that the cable fails when the mechanical actuation force transmitted through the cable exceeds the pre-selected level.

\* \* \* \* \*

UNITED STATES PATENT AND TRADEMARK OFFICE
CERTIFICATE OF CORRECTION

PATENT NO. : 7,581,377 B2 Page 1 of 1
APPLICATION NO. : 11/452297
DATED : September 1, 2009
INVENTOR(S) : Robert A. Daukant It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this

Fourteenth Day of September, 2010

David J. Kappos
*Director of the United States Patent and Trademark Office*